US006854272B2

United States Patent
Finger et al.

(10) Patent No.: US 6,854,272 B2
(45) Date of Patent: Feb. 15, 2005

(54) EXHAUST GAS TURBOCHARGER FOR AN INTERNAL COMBUSTION ENGINE

(75) Inventors: Helmut Finger, Leinfelden-Echterdingen (DE); Lothar Lenke, Koengen (DE); Erwin Schmidt, Baltmannsweiler (DE); Siegfried Sumser, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/283,682

(22) Filed: Oct. 30, 2002

(65) Prior Publication Data

US 2003/0079474 A1 May 1, 2003

(30) Foreign Application Priority Data

Oct. 31, 2001 (DE) .......................... 101 53 301

(51) Int. Cl.[7] .................... F02D 23/00; F01B 25/02
(52) U.S. Cl. ............... 60/602; 415/150; 415/191; 415/160
(58) Field of Search ................. 60/602; 415/150, 415/158, 157, 159, 160, 163, 165, 164

(56) References Cited

U.S. PATENT DOCUMENTS

| 4,231,703 | A | * | 11/1980 | Weiler .................... 415/160 |
| 5,616,000 | A | * | 4/1997 | Yamada et al. ............ 415/191 |
| 5,873,696 | A | * | 2/1999 | Harada et al. ............ 415/150 |
| 6,378,305 | B1 | * | 4/2002 | Sumser et al. ............ 60/602 |
| 6,378,307 | B1 | * | 4/2002 | Fledersbacher et al. ..... 60/602 |

FOREIGN PATENT DOCUMENTS

| DE | 4232400 | 8/1993 | |
| DE | 19543190 | 11/1995 | |
| DE | 197 52 534 | 8/1998 | ........... 415/160 |
| EP | 0939198 | 9/1999 | ........... 60/602 |

OTHER PUBLICATIONS

Arnd Wolfram Reichert: "Strömungssimmulation zur optimierten Gestaltung von Turbonmaschinenkomponenten" 1995, Hänsel–Hohenhausen Egelsbach XP002242093 (pp. 81–117).

Arnd Wolfram Reichert: "Strömungssimulationen zur optimierten Gestaltung von Turbomaschinenkomponenten" Duisburg, 1994, published: Hänsel–Hohenhausen.

* cited by examiner

Primary Examiner—Thomas Denion
Assistant Examiner—Thai-Ba Trieu
(74) Attorney, Agent, or Firm—Collard & Roe, P.C.

(57) ABSTRACT

An exhaust gas turbocharger for an internal combustion engine, which has an exhaust gas turbine in the exhaust system and a compressor in the induction system, comprises a variable turbine geometry, associated with the turbine, for adjustably setting a radial inlet cross section for the flow to the turbine rotor. The variable turbine geometry is configured as a guide cascade ring, which has guide vanes distributed over the periphery and encompasses the turbine rotor. The minimum distance between two adjacent guide vanes obeys a specified relationship with respect to the diameter of the turbine rotor and the number of guide vanes of the guide cascade ring. In addition, a flow edge is provided on the radially inner surface of each guide vane.

9 Claims, 2 Drawing Sheets

EXHAUST GAS TURBOCHARGER FOR AN INTERNAL COMBUSTION ENGINE

BACKGROUND

The invention relates to an exhaust gas turbocharger for an internal combustion engine.

Such an exhaust gas turbocharger is described in the publication DE 197 52 534 C1. The exhaust gas turbocharger comprises a compressor, which is arranged in the induction system of the internal combustion engine and is connected by means of a shaft to an exhaust gas turbine located in the exhaust system of the internal combustion engine, which exhaust gas turbine is driven by the exhaust gases, of the internal combustion engine, which are at an increased exhaust gas back pressure. The compressor then induces ambient air and compresses the latter to an increased boost pressure, at which the combustion air is supplied to the internal combustion engine.

The exhaust gas turbine is equipped with a variable turbine geometry which permits the inlet flow cross section in the turbine to be adjustably set relative to the turbine rotor. Both during engine braking performance and in the fired propulsion mode of operation, this opens the possibility of covering a relatively wide performance spectrum for generating engine braking power and propulsion power. In this arrangement, the variable turbine geometry is converted into a back-pressure position, which reduces the inlet flow cross section, during engine braking operation. By this means, the exhaust gas back pressure is increased and the pistons of the internal combustion engine have to perform additional compression work against the exhaust gas back pressure. In the fired propulsion mode of operation, the variable turbine geometry is usually converted into an open position, which extends the inlet flow cross section and in which the maximum exhaust gas flow through the exhaust gas turbine is made possible.

The variable turbine geometry is embodied as a guide cascade, which is arranged in the inlet flow cross section and to which guide vanes are pivotably fastened, the guide vanes extending over the periphery of the guide cascade and each having a pivoting axis parallel to the axis of rotation of the supercharger. In the back-pressure position, the guide vanes are pivoted into a position in which only a minimum flow cross section is freed between two adjacent guide vanes. In the open position, on the other hand, there is a maximum flow path between adjacent guide vanes.

Because of the high exhaust gas back pressure and the reduced flow cross section between adjacent guide vanes during engine braking operation, the problem can arise that compression shocks occur in the supersonic range in such guide cascades; these impinge on the turbine rotor and can lead to destruction of the turbine rotor blades. Efforts are therefore made to attenuate compression shocks in the exhaust gas flowing onto the turbine rotor but without impairing the engine braking effect, which latter presupposes a restricted inlet flow cross section. Although such compression shocks can be reduced by means of a relatively large distance between guide cascade and turbine rotor, this leads to a large design, which is not usually realizable because of the restricted space relationships in the engine compartment or in the internal combustion engine.

From the dissertation "Strömungssimulation zur optimierten Gestaltung von Turbomaschinenkomponenten" (Flow simulation of the optimized design of turbomachine components) by A. W. Reichert, Duisburg, 1994, it is known art—in the case of large-sized, stationary turbomachines—to provide a guide cascade ring which contains guide vanes and radially encompasses the turbine rotor. On their inner surface, these guide vanes have a flow edge, which effects a multiple reflection of the compression shock of the entering gaseous medium, by which means the compression shock is attenuated. This dissertation does not, however, provide for an application to small-sized exhaust gas turbochargers.

SUMMARY

The invention is based on the problem of creating a small-sized exhaust gas turbocharger with variable turbine geometry for an internal combustion engine, which exhaust gas turbocharger is characterized by a long life and is suitable for generating a high engine braking performance. In particular, the compression shocks impinging on the turbine rotor are to be reduced without impairing the engine braking performance.

The exhaust gas turbocharger has an exhaust gas turbine in the exhaust system and a compressor in the induction system. The turbocharger comprises a variable turbine geometry, associated with the turbine, for adjustably setting a radial inlet cross section for the flow to the turbine rotor. The variable turbine geometry is configured as a guide cascade ring, which has guide vanes distributed over the periphery and encompasses the turbine rotor. The minimum distance between two adjacent guide vanes obeys a specified relationship with respect to the diameter of the turbine rotor and the number of guide vanes of the guide cascade ring.

A flow edge with an advantageously convex flow profile is arranged on the radially inner surface of each guide vane, the angle of the flow edge obeying a specified function with respect to the isentropic exponent and an average Mach number in the region of the guide vane trailing edge. The flow edge is preferably located in the region of the narrowest cross section or the smallest distance between two adjacent guide vanes and improves the flow relationships through the guide cascade, an expansion of the flow into the supersonic range taking place, in particular downstream of the flow edge. In the case of small-sized exhaust gas turbochargers, providing such a flow edge represents a significant improvement in the behavior of the through-flow of exhaust gas between adjacent guide vanes. Compression shocks in the supersonic range are reflected one or more times on the guide vane surfaces due to the special profiling between adjacent guide vanes of the guide cascade; this leads to an attenuation of the shock and a correspondingly lower loading on the turbine rotor. Particularly in the case where, at least in the back-pressure position, sections of each two adjacent guide vanes overlap, viewed over the periphery of the guide cascade ring, an externally directed compression shock starting from the trailing edge of the inner guide vanes occurs initially on entry of the exhaust gas into the flow cross section between adjacent guide vanes. This compression shock is subsequently reflected on the inner region of the outer guide vane and is directed inward in the direction of the turbine rotor. Due to the reflection of the compression shock, the latter is substantially attenuated before its impingement on the turbine wheel and the danger of a rotor blade fracture is reduced.

The minimum distance between two adjacent guide vanes, which are located in the back-pressure position, is not more than 50% of the diameter of the turbine rotor, divided by the number of guide vanes distributed over the periphery of the guide cascade ring. This relationship takes account of the need, in the back-pressure position of the variable turbine geometry, to set the smallest possible cross section for the flow to the turbine rotor, which is the condition for the generation of high braking performance in engine braking operation.

The relationship quoted creates a relationship between the minimum distance between adjacent guide vanes in the back-pressure position, the turbine rotor diameter in the region of the inlet flow cross section for the exhaust gas and the number of guide vanes in the guide cascade ring. By this means, a dimensioning rule is obtained for the distance between adjacent guide vanes, taking account of the design requirement to create a small-sized supercharger.

In a particularly advantageous development, the smallest distance is not more than 30% of the turbine rotor diameter divided by the number of guide vanes, it being also, of course, possible to consider values between 30% and 50%, if appropriate also less than 30%, or also exactly 30% or exactly 50%.

In a preferred development, the thickness of the trailing edge of a guide vane can, as a further dimensioning rule, be set to at least 20% of the minimum distance between the guide vanes in the back-pressure position. This value for the trailing edge thickness of each guide vane is, on the one hand, small enough to avoid high flow velocities, particularly in the region of the flow around the trailing edge, and separations at the trailing edge and is, on the other hand, large enough to ensure sufficient material strength to withstand the high mechanical and thermal stresses during engine braking operation.

As a further dimensioning rule, in particular for the design of a small-sized supercharger, it is possible to select, in an expedient development, the distance between the trailing edge of a guide vane and the periphery of the turbine rotor to be smaller or equal to 10%, in particular smaller or equal to 5%, it being also possible to consider both intermediate values between 5% and 10% and values smaller than 5% or exactly 5% or 10%, referred to the diameter of the turbine rotor in each case. This type of dimensioning reduces the gap between the periphery of the turbine rotor and the guide cascade to a minimum in the region of the inlet flow cross section, by which means a particularly compact design is achieved.

The guide cascade with the guide vanes, which guide cascade forms the variable turbine geometry, is expediently embodied either as a cascade, with fixed guide vanes, which can be moved axially into the inlet flow cross section or as a cascade, with guide vanes which can be rotationally moved, which cascade has a fixed location in the inlet flow cross section. If appropriate, however, further design embodiments can also be considered.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

Accordingly, while at least one embodiment of the present invention has been shown and described, it is to be understood that many changes and modifications may be made thereunto without departing from the spirit and scope of the invention as defined in the appended claims.

DETAILED DESCRIPTION

Figure 1:
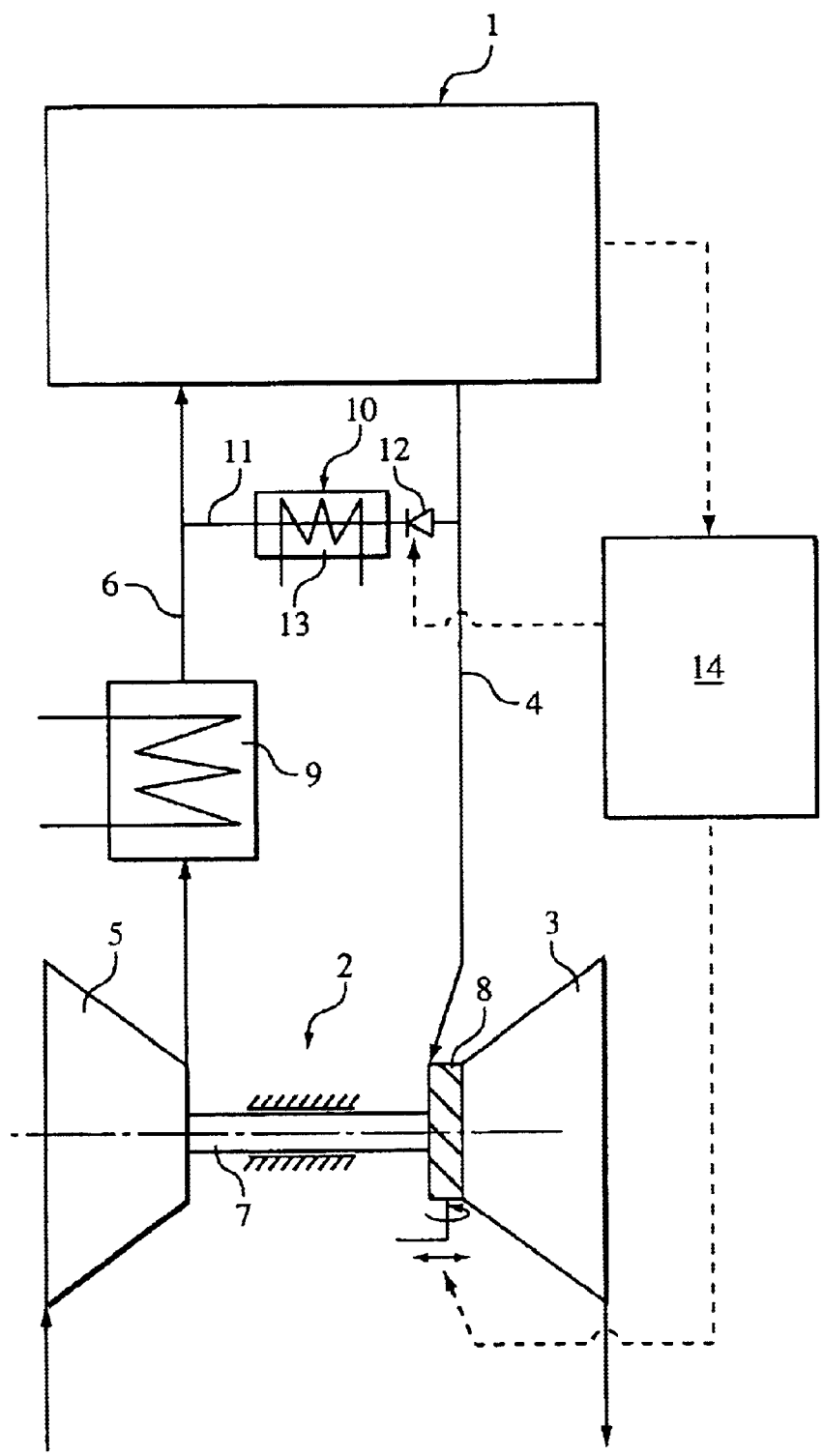
FIG. 1 shows a diagrammatic representation of an internal combustion engine with an exhaust gas turbocharger whose exhaust gas turbine is equipped with variable turbine geometry, which is embodied as a guide cascade ring, with guide vanes, as is represented in FIGS. 2 and 3.

An exhaust gas turbocharger 2, with an exhaust gas turbine 3 in an exhaust system 4, and a compressor 5 in an induction system 6, are associated with the internal combustion engine represented in FIG. 1—a spark-ignition engine or a diesel engine. Exhaust gas turbine 3 is driven by the positive-pressure exhaust gases of the internal combustion engine and transmits the rotational motion of its turbine rotor to compressor 5 by means of a shaft 7, which compressor 5 induces ambient air at atmospheric pressure and compresses it to an increased boost pressure. The compressed air is first cooled in a boost air cooler 9 and subsequently supplied as boost air to the cylinder inlets of internal combustion engine 1. At the exhaust end, the expanded exhaust gas—after flowing through exhaust gas turbine 3—is first subjected to a cleaning process and is finally led away to the atmosphere.

Exhaust gas turbine 3 is provided with a variable turbine geometry 8, which permits an adjustable setting of the cross section for the inlet flow to the turbine rotor in the exhaust gas turbine. The setting of the variable turbine geometry takes place as a function of the condition parameters and operating parameters of the internal combustion engine and the associated units. The variable turbine geometry can be adjusted between a minimum opening back-pressure position of the inlet flow cross section and an open position which maximizes the inlet flow cross section. The back-pressure position is, in particular, adopted in engine braking operation of the internal combustion engine in order to generate the highest possible exhaust gas back-pressure, which acts against the ejection work performed in the cylinders of the internal combustion engine. The maximum opening position is, in particular, adopted at high load or engine speed in the fired propulsion mode of operation.

In addition, an exhaust gas recirculation system 10 is associated with internal combustion engine 1, which exhaust gas recirculation device 10 comprises a recirculation conduit 11 between exhaust system 4 and induction system 6 and an adjustable recirculation valve 12 and a cooler 13.

All the units are set, as a function of the condition parameters and operating parameters of the internal combustion engine, by means of a closed-loop and open-chain unit 14; variable turbine geometry 8 and recirculation valve 12 in exhaust gas recirculation system 10, in particular, are adjusted by means of closed-loop and open-chain unit 14.

Variable turbine geometry 8 is embodied as an adjustable guide cascade. An exemplary embodiment of such a guide cascade is represented in FIGS. 2 and 3.

Figure 2:
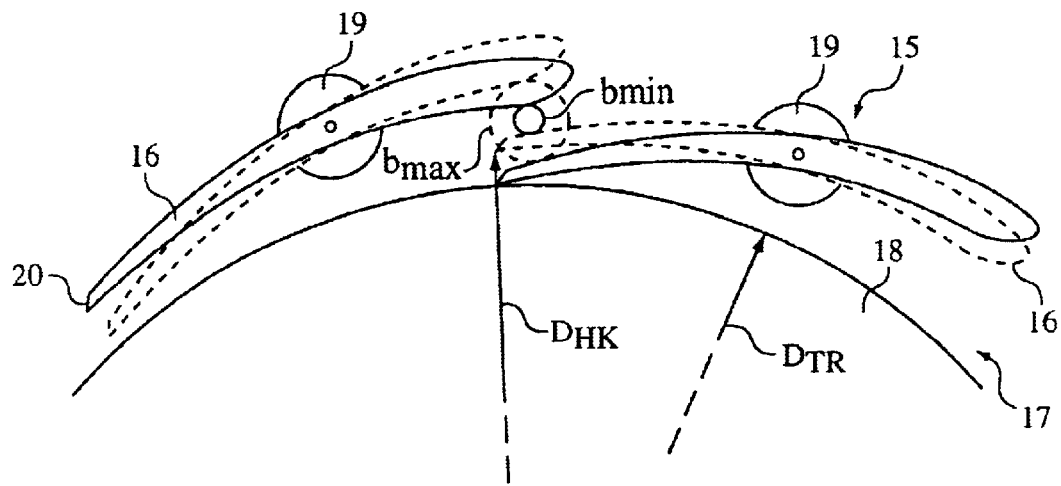
FIG. 2 shows an excerpt from the guide cascade ring of the variable turbine geometry with two guide vanes, represented in the back-pressure position (full line) and open position (interrupted line)
Figure 3:
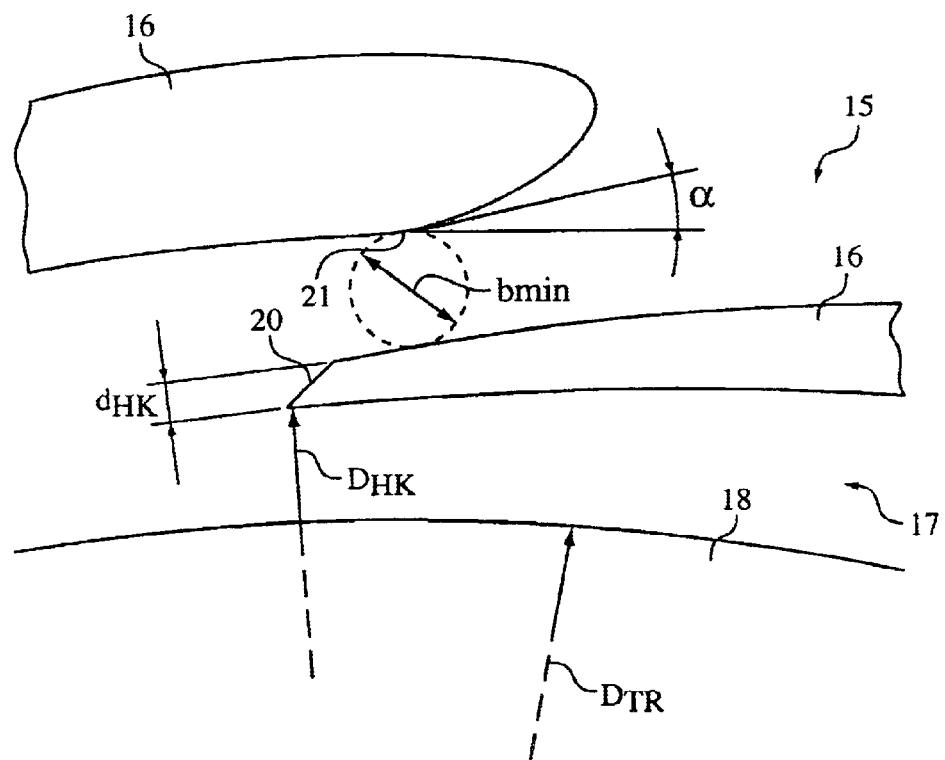
FIG. 3 shows an excerpt enlargement of the representation of FIG. 2 from the region of the narrowest flow cross section between two adjacent guide vanes, represented in the back-pressure position.

As shown in FIG. 2, the variable turbine geometry consists of a guide cascade 15, which has a plurality of guide vanes 16 distributed around the periphery, in which arrangement a total of nine guide vanes can, advantageously, be provided but, if appropriate, a number of guide vanes differing from this can also be provided. Guide cascade 15 with the guide vanes is embodied as a guide cascade ring and radially encompasses a turbine rotor 18 of the exhaust gas turbine. An inlet flow cross section 17 is formed between turbine rotor 18 and guide cascade 15; the exhaust gas flowing in radially through the flow paths between adjacent guide vanes 16 impinges, by means of inlet flow cross section 17, on the turbine blades of turbine rotor 18. The maximum diameter of the turbine rotor in the region of the inlet flow cross section is designated by $D_{TR}$.

Guide vanes 16 are, advantageously, adjustably held on guide cascade 15 by means of setting shafts 19. Setting shafts 19 permit a relative pivoting motion with respect to guide cascade 15, by which means the angular position of guide vanes 16 can be set between the back-pressure position represented by a full line and the open position represented by an interrupted line. In the back-pressure position,—which is also shown in an enlarged representation in FIG. 3—the distance, and therefore also the flow path, between adjacent guide vanes 16 is at a minimum; it is designated by $b_{min}$. The minimum distance $b_{min}$ between adjacent guide vanes in the back-pressure position is, for example, of the order of magnitude between 2.5 and 3 mm. In the open position, the distance between adjacent guide vanes is at a maximum; it is designated by $b_{max}$.

The minimum distance $b_{min}$ in the back-pressure position of the guide vanes can be selected, with respect to the diameter $D_{TR}$ of the turbine rotor and the number z of the guide vanes of the guide cascade ring, from the relationship $$b_{min} \leq 0.5 D_{TR}/z,$$

i.e. the minimum distance $b_{min}$ is smaller than or equal to 50% of the turbine rotor diameter $D_{TR}$, divided by the number z of the guide vanes. If appropriate, the smallest distance $b_{min}$ can also be smaller than or equal to 30% of the diameter of the turbine rotor, divided by the number of the guide vanes.

As a further dimensioning rule, twice the distance between a trailing edge 20 of each guide vane 16 and the supercharger center line, designated by $D_{HK}$, can be established from the relationship $$D_{HK} \leq 1.1 D_{TR},$$

where the distance $D_{HK}$ refers to the back-pressure position of guide vanes 16. From this relationship, the distance between the trailing edge of each guide vane in the back-pressure position and the periphery of the turbine rotor in the region of the inlet flow cross section is smaller than or equal to 10% of the turbine rotor diameter DTR in the region of the inlet flow cross section. If appropriate, a value smaller than or equal to 5% of the turbine rotor diameter can also be considered.

As can be seen from FIG. 3, trailing edge 20 of each guide vane 16 can be tapered on one side, the taper including an angle smaller than 90° with a flow vector through the flow path between adjacent guide vanes 16. The taper on one side of trailing edge 20 limits the maximum flow Mach number attained during the flow round the trailing edge 20 and prevents separations at the trailing edge 20.

The trailing edge thickness $d_{HK}$ is expediently at least 20% of the minimum distance $b_{min}$ between guide vanes 16 in the back-pressure position.

In both the back-pressure position and in the open position, the guide vanes advantageously have a mutually overlapping region in the peripheral direction, the flow path between the final section of the radially inner guide vane and the front section of the immediately adjacent, radially outer guide vane being located in this region. In the region of the narrowest cross section $b_{min}$ of the flow path between adjacent guide vanes, a flow edge 21 is advantageously formed on the inside of the radially outer guide vane, flow edge 21 possessing a convex, but straight flow profile and including an angle α, which obeys the relationship $$\alpha = k \arctan\left(\frac{1}{k}\sqrt{M^2-1}\right) - \arctan\left(\sqrt{M^2-1}\right),$$

$$k = \sqrt{\frac{\kappa+1}{\kappa-1}}$$

In this, M designates an average Mach number—set for example at the value 2—in the region of the guide vane trailing edge 21 and κ designates the isentropic exponent. The relationship quoted for the angle of the flow edge can also, if appropriate, be employed for the design of guide vanes cascades in exhaust gas turbochargers for internal combustion engines, independently of the further geometrical relationships quoted above.

What is claimed:

1. An exhaust gas turbocharger for an internal combustion engine, having an exhaust gas turbine, which is arranged in the exhaust system of the internal combustion engine, and a compressor, which is arranged in the induction system and is connected to the exhaust gas turbine by means of a shaft, having variable turbine geometry associated with the exhaust gas turbine for adjustably setting a radial flow inlet cross section to the turbine rotor between a back-pressure position which reduces the inlet flow cross section and an open position which increases the inlet flow cross section, the variable turbine geometry being configured as a guide cascade, which encompasses the turbine rotor and has guide vanes distributed around the periphery, and adjacent guide vanes having a minimum distance apart ($b_{min}$) in the back-pressure position in order to secure a flow path in the direction of the turbine rotor, wherein the minimum distance ($b_{min}$) between two adjacent guide vanes in the back-pressure position is $$b_{min} \leq 0.5 D_{TR}/z,$$

where $D_{TR}$ designates the diameter of the turbine rotor, z designates the number of guide vanes of the guide cascade, and in that there is a flow edge on the radially inner surface of each guide vane—on the surface facing towards the adjacent guide vane—the flow edge including an angle (α), which obeys the relationship $$\alpha = k \arctan\left(\frac{1}{k}\sqrt{M^2-1}\right) - \arctan\left(\sqrt{M^2-1}\right),$$

$$k = \sqrt{\frac{\kappa+1}{\kappa-1}}$$

where

M designates an average Mach number in the region of the guide vane trailing edge, κ designates the isentropic exponent.

2. The exhaust gas turbocharger according to claim 1, wherein the minimum distance apart ($b_{min}$) between two adjacent guide vanes obeys the relationship $$b_{min} \leq 0.3 D_{TR}/z.$$

3. The exhaust gas turbocharger according to claim 1, wherein sections of each two adjacent guide vanes overlap in the peripheral direction of the guide cascade, at least in the back-pressure position.

4. The exhaust gas turbocharger according to claim 1, wherein a radially inner trailing edge of a guide vane has a trailing edge thickness which is at least 0.2 times the minimum distance between adjacent guide vanes.

5. The exhaust gas turbocharger according to claim 1, wherein twice a distance ($D_{HK}$) between the supercharger center line and the trailing edge of a guide vane obeys the relationship $$D_{HK} \leq 1.1 D_{TR}$$

with respect to the diameter ($D_{TR}$) of the turbine rotor.

6. The exhaust gas turbocharger according to claim 5, wherein twice the distance apart ($D_{HK}$) between the supercharger center line and the trailing edge of a guide vane obeys the relationship $$D_{HK} \leq 1.05 D_{TR}$$

with respect to the diameter ($D_{TR}$) of the turbine rotor.

7. The exhaust gas turbocharger according to claim 1, wherein the guide vanes are immovably connected to the guide cascade and the guide cascade is moved axially into the inlet flow cross section, the position in which the guide cascade is moved into the inlet flow cross section corresponding to the back-pressure position and the position in which the guide cascade is moved out of the inlet flow cross section corresponding to the open position.

8. The exhaust gas turbocharger according to claim 1, wherein the guide vanes are coupled to the guide cascade so that the guide vanes rotate and have to be adjusted between the back-pressure position and the open position.

9. The exhaust gas turbocharger according to claim 1, wherein a total of nine guide vanes, which are distributed over the periphery of the guide cascade, are provided.

* * * * *